(12) United States Patent
Fang et al.

(10) Patent No.: US 6,507,322 B2
(45) Date of Patent: Jan. 14, 2003

(54) SPACE DIVERSITY SLOT ANTENNAS AND APPARATUS USING THE SAME

(75) Inventors: Chien-Hsing Fang, Taipei Hsien (TW); Lin Huey-Jen, Taipei Hsien (TW)

(73) Assignee: Acer NeWeb Corp., Taipei Hsien (TW)

( * ) Notice: Subject to any disclaimer, the term of this patent is extended or adjusted under 35 U.S.C. 154(b) by 0 days.

(21) Appl. No.: 09/934,829

(22) Filed: Aug. 23, 2001

(65) Prior Publication Data

US 2002/0175864 A1 Nov. 28, 2002

(30) Foreign Application Priority Data

May 22, 2001 (TW) ...................................... 90112176 A

(51) Int. Cl.[7] .............................................. G01S 5/02
(52) U.S. Cl. ...................................... 343/770; 343/702
(58) Field of Search ................... 343/770, 767, 343/702, 700 MS, 768, 769; 455/90, 89

(56) References Cited

U.S. PATENT DOCUMENTS 5,423,697 A * 6/1995 MacGregor ................. 439/638
6,031,503 A * 2/2000 Preiss, II et al. ........... 343/770
6,052,093 A * 4/2000 Yao et al. .................... 343/770

* cited by examiner

*Primary Examiner*—Don Wong
*Assistant Examiner*—James Clinger
(74) *Attorney, Agent, or Firm*—Bacon & Thomas

(57) ABSTRACT

The object of the present invention is to provide an antenna pair that has the advantages of easy installation and improved gain. According to the present invention, the antenna pair consists of two slot antennas formed on a metallic strip and sharing a common portion of the strip as the grounding unit. The grounding portions of the antennas join together to become the grounding unit so as to increase the effective antenna aperture for both of the antennas and to raise their gains. As the antennas are combined into one, it is more manageable and handy for installation. The grounding unit can be further extended to allow greater improvement. The strip on which the slot antennas are formed is curved to have the antennas orthogonal to each other. The orthogonality brings about the space diversity effect and prevents the occurrence of any null in the radiation pattern of the antennas.

17 Claims, 3 Drawing Sheets

SPACE DIVERSITY SLOT ANTENNAS AND APPARATUS USING THE SAME

REFERENCE TO RELATED APPLICATIONS

The present application claims priority to Taiwan application NO. 090112176 entitled "Antenna for wireless communication apparatus" filed on May 22, 2001.

BACKGROUND OF THE INVENTION

1. Field of the Invention

The present invention relates to wireless communication technology. More particularly it relates to antennas for wireless communication and apparatus using the antennas for bridging mobile devices and wired networks.

2. Description of the Related Art

Wireless transmission of audio and video data over the air is gaining popularity among users of notebooks, portable digital assistances, and mobile phones. For mobile devices to have access to wired networks, such as local area networks (LAN) or the Internet, an access point or gateway is required that serves as a bridge between the wired networks and the wireless domain. It is also required that the access point and the mobile devices accessing wired networks through it follow the same wireless communication standard. So far, the most supported standard is IEEE802.11b.

The prior art access point that supports IEEE802.11b usually has two separate antennas pointing outward that can be manually adjusted by the user. This allows the communication quality of the antennas to be tuned according to various ambient conditions. Such configuration requires time-consuming procedures to have the separate antennas installed on the access point, and causes thereby inconveniences during the manufacturing process. The pointed antennas of the prior art also may at times obstruct other facilities around them, especially when the access point is placed in a crowded space. Therefore, an antenna pair structure that can overcome installation difficulties and can be concealed inside the housing of a wireless device is needed.

SUMMARY OF THE INVENTION

The object of the present invention is to provide an antenna pair that has the advantages of easy installation and improved gain. According to the present invention, the antenna pair consists of two slot antennas formed on a metallic strip and sharing a common portion of the strip as the grounding unit. The grounding portions of the antennas join together to become the grounding unit so as to increase the effective antenna aperture for both of the antennas and to raise their gains. As the antennas are combined into one, it is more manageable and handy for installation. In the embodiments to be disclosed below, the grounding unit is further extended to allow greater improvement. The strip on which the slot antennas are formed is curved to have the antennas orthogonal to each other. The orthogonality brings about the space diversity effect and prevents the occurrence of any null in the radiation pattern of the antennas.

Another object of the present invention is to provide an antenna pair that can be concealed inside an electronic device. In the embodiment of the present invention, the mutually orthogonal slot antennas are disposed respectively on adjacent sides of a U-shaped or rectangular metallic strip that fit right into a wireless access point device by attaching each side of the strip onto the inner walls of its housing. The antennas are thereby hidden from the outside, which gives the device a more compact and appealing look without interfering with nearby facilities.

BRIEF DESCRIPTION OF THE DRAWINGS

The following detailed description, which is given by way of example, and not intended to limit the invention to the embodiments described herein, can best be understood in conjunction with the accompanying drawings, in which.

DETAILED DESCRIPTION OF THE INVENTION

Figure 1:
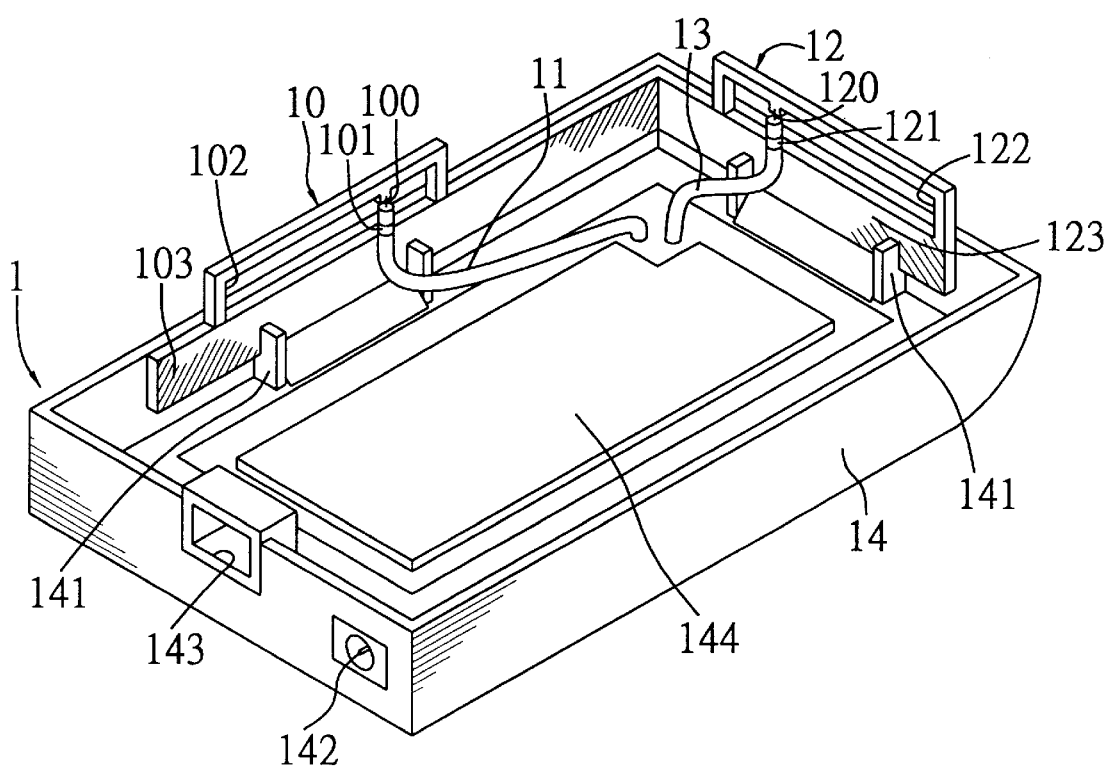
FIG. 1 illustrates a wireless access point inside which a two-in-one antenna structure is mounted as the first embodiment of the present invention.

Please refer to FIG. 1, in which is illustrated the structure of a wireless access point. The access point 1 is powered through power plug 142 and includes two slot antennas 10, 12, a main circuit board 144, and a housing 14 that encloses the antennas 10, 12 and the circuit board 144. The slot antennas 10, 12 are coupled to the circuit board 144, through co-axial cables 11, 13 respectively, in which the IEEE 802.11b module is incorporated. The access point 1 also includes a RJ45 interface connector 143 coupled at one end to the circuit board 144 and connected at the other end to an Ethernet port of wired networks. The access point 1 functions to bridge the wired networks and the wireless fields of mobile devices.

According to IEEE 802.11b protocol, two antennas are utilized for wireless communication, one labeled as MAIN, the other AUX (auxiliary). The MAIN antenna and the AUX antenna are switchable when receiving electromagnetic (EM) signals through a RF switch controlled by an IEEE 802.11b module. Because the MAIN antenna and the AUX antenna can be installed separately in different orientations and configurations with different radiation intensity patterns, EM waves originating from a particular direction will cause different receiving intensity levels on the antennas. When receiving EM signals from that direction, the receiving intensity level of the signals on the MAIN antenna, which is closely related to the radiation pattern of the MAIN antenna, is compared to that on the AUX antenna and the one with higher receiving intensity level is selected by the RF switch to be the receiving antenna of the signals. On the other hand, when radiating EM signals into space the IEEE 802.11b protocol sets the MAIN antenna as the radiating antenna.

In the context of FIG. 1, the slot antenna 10 can be designated as the MAIN antenna, and the slot antenna 12 the AUX antenna. When request signals originating from a mobile device in space are received by the antennas 10, 12, they will be sent through the cables 11, 13 to the circuit board 144 for decoding by IEEE 802.11b module. The decoded signals are subsequently transferred through connector 143 to the wired networks to be responded. Later, when responses from the wired networks are received through the connector 143, they are first encoded by IEEE 802.11b module in the circuit board 144, and are then transmitted via the (MAIN) antennas 10 back to the mobile device making the requests. With the help of the access point 1, the availability of information on the wired network is extended to the wireless domains.

As shown in FIG. 1, the slot antennas 10, 12 are secured on the inner walls of the housing 14 by holding structure 141. The slot antenna 10 consists of a grounding portion 103, and a radiating unit 102 surrounding an opening in which the resonance of EM waves occurs. Signals are fed into the radiating unit 102 at feed 100 via co-axial cable 11. Similarly the antenna 12 is of the same structure and composes a radiating unit 122 having a feed 120 connected to cable 13, and a grounding portion 123. The slot antennas 10, 12 are preferably omni-directional and are placed orthogonal to each other in order to achieve space diversity effect without causing significant drops of radiation intensity level or nulls in the overall radiation pattern. By their being orthogonal the antennas are able to maintain communication quality when the access point 1 is displaced and reoriented under various operating conditions that are confronted. Furthermore, the grounding portion 103 of the antenna 12 extends along the inner side wall of the housing 14 and finally merges at one end with the grounding portion 123 of the antenna 12, which unites the two slot antennas into one single structure in the form of letter "L" that is easy to handle and can be conveniently installed. The merging enlarges both the grounding portion 103 and 123 and causes the effective antenna aperture of the slot antenna 10 and 13 to expand, the result of which is the broadening of bandwidths of the antenna 10 and the antenna 13 and increased gains.

Figure 2:
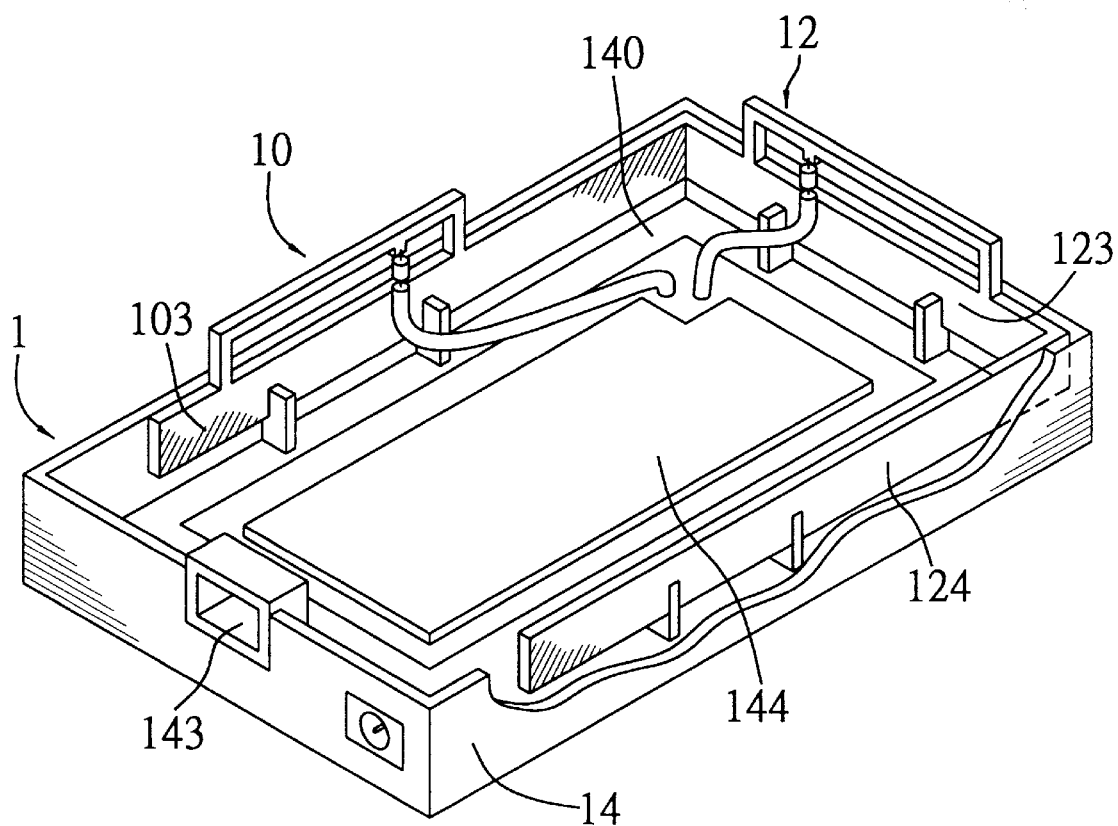
FIG. 2 illustrates the second embodiment of the two-in-one antenna structure according to the present invention.

Refer to FIG. 2, wherein is illustrated another embodiment of the present invention. According to the embodiment, the grounding portion 123 further extends at one end along housing 14 to form an extension portion 124 facing the slot antenna 10 in parallel and the bandwidths of the antennas can be further broadened. The two antennas and the extension portion 124 thus assume an U-shaped integral structure that fits right into the housing 14. As described here above and understood by those skilled in the art, the U-shaped antenna pair structure is advantageous over the prior art by having broadened bandwidths, increased gains, and increased physical integrity for easy installation. It is also advantageous by the two antennas being able to be manufactured at the same time with lowered cost.

Figure 3:
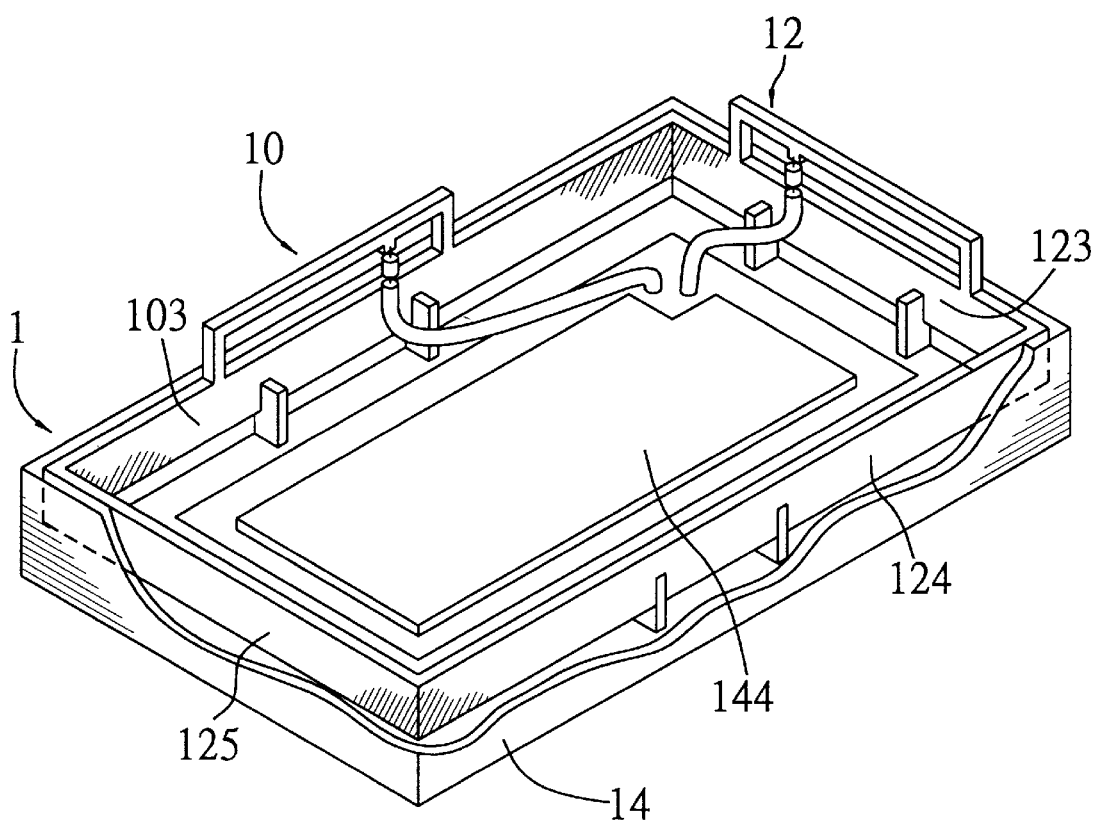
FIG. 3 illustrates the third embodiment of the two-in-one antenna structure according to the present invention.

In another embodiment of the present invention, as shown in FIG. 3, the extension portion 124 further extends along the housing 14 into extension portion 125 that in the end merges with the grounding portion 103, thereby constituting a rectangular structure with two slot antennas disposed on its adjacent sides. As already explained here above, the extension portion 125, in addition to the extension portion 124, further increases the gains and broadens the bandwidths of the antennas 10, 13.

Having described the embodiments of the present invention, it should be pointed out that the applications of the present invention are not limited to devices using IEEE 802.11b as the communication protocol. Other standards, such as the emerging Bluetooth technology that utilizes only one antenna for transmitting and receiving signals, can be made to comply with the present invention as well. In that case, one antenna suffices to perform Bluetooth functions, and the other antenna can be set idle. Furthermore, in situations where more than two antennas are needed in a wireless device, the present invention provides the flexibility of allowing the additional antennas to be placed on the extension portion 124 and 125. Finally, the two slot antennas according to the present invention can be arranged in such relations that they are orthogonal to each other while the grounding portion 103 is upright and the grounding portion 123 is slanted or recumbent relative to the housing 14. This offers much more possibilities when the antenna pair is spatially diversified.

It is to be noted that the embodiments and particular features and functions as disclosed above are for the purpose of disclosure only and are not in any sense for limiting the scope of the invention. Small modifications and juxtapositions of one or more of the functional elements anticipated by those skilled in the art without departing the spirit of present invention is to be regarded as a part of the invention. Therefore, that the scope of present invention is determined by the appended claims is fully understood.

What is claimed is:

1. An electronic system for bridging a mobile device and a wired network, comprising:

a pair of slot antennas which enables the transmission and reception of wireless signals between said electronic system and said mobile device;

a wireless communication module coupled to said pair of slot antennas which encodes and decodes signals that are transmitted and received, respectively, through said antenna pair; and an interface coupled to said wireless communication module and coupled to said wired network which enables signal exchanges between said electronic system and said wired network;

wherein said pair of slot antennas comprises:

an elongated plate structure having a first portion and a second portion, each portion having a slot substantially along the longitudinal direction thereof for determining the frequency thereof, said first portion being substantially orthogonal to said second portion, said elongated plate structure further having a third portion extending from one end of said second portion, said first, second, and third portions constituting approximately the letter U.

2. The electronic system according to claim 1, wherein said pair of slot antennas further comprises a pair of feed lines coupling said pair of slot antennas to said wireless communication module.

3. The electronic system according to claim 1, wherein said electronic system further comprises a housing, along the inner walls of which is disposed said elongated plate structure of said pair of slot antennas.

4. The electronic system according to claim 1, wherein said elongated plate structure of said pair of slot antennas further comprises a fourth portion linking said third portion and said first portion, said first, second, third, and fourth portions constituting approximately a rectangular frame.

5. The electronic system according to claim 4, wherein of said elongated plate structure of said pair of slot antennas said first, second, third, and fourth portions are disposed along the inner side walls of said housing of said electronic system.

6. The electronic system according to claim 1, wherein said wireless communication module follows the standard of IEEE 802.11b protocol.

7. The electronic system according to claim 1, wherein said interface is a RJ45 interface.

8. A slot antenna structure comprising:

a first slot antenna having a first grounding portion and a first radiating portion with a first slot, said first grounding portion being elongated in a first longitudinal direction of said first slot antenna along which said first slot is substantially aligned, said first radiating portion comprising a first feed point where electrical signals are fed; and a second slot antenna having a second grounding portion and a second radiating portion with a second slot, said second grounding portion being elongated in a second longitudinal direction of said second slot antenna along which said second slot is substantially aligned, said second radiating portion comprising a second feed point where electrical signals are fed;

wherein,
one end of said first grounding portion of said first slot antenna connects to one end of said second grounding portion of said second slot antenna;

said first longitudinal direction of said first slot antenna and said second longitudinal direction of said second slot antenna are substantially orthogonal seen from a traverse direction of said first slot antenna; and said slot antenna structure further comprising an open-ended extension grounding portion extending from one end of said second grounding portion.

9. The slot antenna structure according to claim 8, further comprising a first feed wire and a second feed wire coupled to said first feed point of said first slot antenna and said second feed point of said second slot antenna, respectively.

10. The slot antenna structure according to claim 8, wherein said first, second, and open-ended extension grounding portions constitute approximately the letter U seen from a traverse direction of said first slot antenna.

11. An wireless information handling system, comprising:
a slot antenna structure which enables the transmission and reception of wireless signals; a wireless communication module coupled to said slot antenna structure which encodes and decodes signals that are transmitted and received, respectively, through said slot antenna structure; and a housing that encloses said slot antenna and said wireless communication module;

wherein said slot antenna structure comprises:
a first slot antenna having a first grounding portion and a first radiating portion with a first slot, said first grounding portion being elongated in a first longitudinal direction of said first slot antenna along which said first slot is substantially aligned, said first radiating portion comprising a first feed point where electrical signals can be fed; and a second slot antenna having a second grounding portion and a second radiating portion with a second slot, said second grounding portion being elongated in a second longitudinal direction of said second slot antenna along which said second slot is substantially aligned, said second radiating portion comprising a second feed point where electrical signals can be fed;

wherein,
one end of said first grounding portion of said first slot antenna connects to one end of said second grounding portion of said second slot antenna;

said first longitudinal direction of said first slot antenna and said second longitudinal direction of said second slot antenna are substantially orthogonal seen from a traverse direction of said first slot antenna; and said slot antenna structure further having a third grounding portion extending from one end of said second grounding portion, said first, second, and third grounding portions constituting approximately the letter U.

12. The wireless information handling system according to claim 11, wherein said first, second, and open-ended grounding portions constitute approximately the letter U seen from a traverse direction of said first slot antenna.

13. The wireless information handling system according to claim 11, wherein said slot antenna structure further comprises a fourth extension grounding portion linking said third grounding portion and said first grounding portion, said first, second, third, and fourth extension grounding portions constituting a closed frame.

14. The wireless information handling system according to claim 13, wherein said first, second, third, and fourth extension grounding portions constitute approximately a rectangular frame.

15. The wireless information handling system according to claim 11, wherein said slot antenna structure is disposed along the inner walls of said housing.

16. A wireless information handling system, comprising:
a slot antenna structure which enables the transmission and reception of wireless signals;

a wireless communication module coupled to said slot antenna structure which encodes and decodes signals that are transmitted and received, respectively, through said slot antenna structure; and a housing that encloses said slot antenna structure and said wireless communication module;

wherein said slot antenna structure comprises:
an elongated conductor strip having a first portion formed with a first slot, a second portion extending from said first portion and formed with a second slot, and a third portion extending from said second portion, said first portion being curved and orthogonal with respect to said second portion, said third portion being curved with respect to said second portion, and said first, second, and third portion being disposed along the inner walls of said housing.

17. The wireless information handling system according to claim 16, wherein said elongated conductor strip further comprises a fourth portion linking said third portion and said first portion so as to constitute a closed frame.

* * * * *